United States Patent
Beck et al.

[11] Patent Number: 5,984,651
[45] Date of Patent: Nov. 16, 1999

[54] HYDRAULIC BRAKE SYSTEM

[75] Inventors: Erhard Beck, Weilburg; Hans-Dieter Reinartz, Frankfurt am Main; Albrecht Otto, Hanau, all of Germany

[73] Assignee: ITT Automotive Europe, GmbH, Frankfurt, Germany

[21] Appl. No.: 08/898,191

[22] Filed: Jul. 22, 1997

Related U.S. Application Data

[62] Division of application No. 08/583,031, Apr. 15, 1996, Pat. No. 5,722,738.

[30] Foreign Application Priority Data

| Jul. 23, 1993 | [DE] | Germany | 43 24 689 |
| Aug. 6, 1993 | [DE] | Germany | 43 26 389 |

[51] Int. Cl.$^6$ ............................. F04B 37/02
[52] U.S. Cl. ................ 417/503; 137/112; 417/470; 417/547
[58] Field of Search .................. 417/470, 547, 417/549, 503; 137/540, 454.2, 539.5, 112

[56] References Cited

U.S. PATENT DOCUMENTS

| 1,385,137 | 7/1921 | Kauffman | 137/543.13 |
| 2,470,372 | 5/1949 | Roth | 137/539.5 |
| 2,479,620 | 8/1949 | Ingham | 137/524 |
| 2,634,743 | 4/1953 | Audemar | 137/112 |
| 2,844,164 | 7/1958 | Robbins | 137/543.13 |
| 3,068,893 | 12/1962 | Nicolaus | 137/540 |
| 3,854,496 | 12/1974 | Broszeit | 137/540 |
| 4,128,110 | 12/1978 | Haytayan | 137/454.2 |
| 4,245,667 | 1/1981 | Braukmann | 137/493 |
| 4,261,381 | 4/1981 | Geiling | 137/101 |
| 4,747,475 | 5/1988 | Hagwood et al. | 188/322.15 |
| 4,827,968 | 5/1989 | Brown | 137/270 |
| 4,875,741 | 10/1989 | Ozawa et al. | 303/116 |
| 4,993,451 | 2/1991 | Kremer | 137/454.2 |
| 5,190,362 | 3/1993 | Schaefer et al. | 303/113.2 |
| 5,234,031 | 8/1993 | Pickett et al. | 137/596.17 |
| 5,479,978 | 1/1996 | Zenkich | 137/493.3 |
| 5,588,503 | 12/1996 | Rinaldo | 184/6.4 |

FOREIGN PATENT DOCUMENTS

| 3326329 | 2/1984 | Germany . |
| 3439408 | 10/1984 | Germany . |
| 4009640 | 6/1991 | Germany . |
| 4027794 | 3/1992 | Germany . |
| 4031533 | 4/1992 | Germany . |
| 851904 | 10/1960 | United Kingdom ............ 137/539.5 |
| WO8809278 | 12/1988 | WIPO . |
| WO9205990 | 4/1992 | WIPO . |
| 9209464 | 6/1992 | WIPO . |
| WO9308053 | 4/1993 | WIPO . |

OTHER PUBLICATIONS

Search Report of the German Patent Office for Appln No. P4324689.3.
English Translation of International Preliminary Examination Reprot for Application No. PCT/EP94/02350. Jul. 16, 1994.

*Primary Examiner*—Charles G. Freay
*Assistant Examiner*—Robert Z. Evora
*Attorney, Agent, or Firm*—Rader, Fishman & Grauer PLLC

[57] ABSTRACT

The present invention relates to a hydraulic brake system which operates by the feedback principle during brake slip control operations and includes a self-priming pump that aspirates pressure fluid from a pressure fluid reservoir for traction slip control operations. In order to improve the delivery rate of the pump, having a parallel arrangement of the two suction valves, a special construction of the pump-assembly is proposed, wherein the two suction valves are integrated in the pump housing. Advantageously, the suction valves are in axially opposed relationship, and the first suction valve is arranged on the movable piston, and the second suction valve is connected with a screw cap. Further, a pump for a slip-controlled hydraulic brake system according to the present invention is suggested having at least one suction valve with a valve seat, a closure member and a valve spring, the preload of the valve spring being variable in response to the position of a delivery piston. A means is provided that is capable of exerting a force on the closure member which counteracts the force exerted by the valve spring during the suction stroke of the delivery piston.

7 Claims, 5 Drawing Sheets

HYDRAULIC BRAKE SYSTEM

This is a divisional of application Ser. No. 08/583,031 filed on Apr. 15, 1996, U.S. Pat. No. 5,722,738.

TECHNICAL FIELD

The present invention generally relates to a hydraulic brake system and more particularly relates to brake slip control and traction slip control for use in vehicle brake systems.

BACKGROUND

A brake system of this type is disclosed in German patent No. 34 39 408. The known brake system operates by the feedback principle during brake slip control operations. The return pump is of the self-priming type and aspirates pressure fluid from the low-pressure reservoir through a first suction valve and a first suction line for brake slip control. For traction slip control, the return pump aspirates pressure fluid from the pressure fluid reservoir through a second suction valve and a second suction line including a changeover valve, through the brake line and the master cylinder. Compared to other brake systems, in which the two suction lines are connected to conduct fluid through a common suction valve to the suction side of the pump and in which an additional suction valve is arranged in the first suction line preventing the development of a vacuum in the low-pressure accumulator, the parallel arrangement of the suction valves has the advantage that only one suction valve must be overcome during brake slip control and traction slip control operations. This reduces throttling effects, so that the delivery rate of the pump is improved.

A pump of this type is disclosed in German patent application, No. 40 27 794, for example. The pump described in the application is a radial piston pump with a delivery piston on which the valve seat for the suction valve is provided. The closure member of the suction valve is acted upon by a valve spring supported on the housing. The preload of the valve spring increases when the pressure chamber is decreased by a movement of the piston. The preload of the valve spring is at its maximum at the upper dead center of the piston, i.e. when the pressure chamber has its smallest volume. Thus, the opening pressure of the suction valve to be overcome is greatly increased compared to the lower dead center of the piston.

To provide a constant opening pressure of the suction valve, attempts have been made to captivate the valve spring of the suction valve. However, even this arrangement does not achieve the optimal flow characteristic curve of a pump of this type that is intended for use in a traction-slip controlled brake system, for example.

An object of the present invention is to provide a favorable structure of a generic brake system.

Another object of the present invention is to provide a hydraulic pump wherein the pilot pressure of the suction valve proximate the upper dead center of the delivery piston is lower than the pilot pressure proximate the lower dead center.

The integration of both suction valves in the pump housing permits an easy assembly because there is no need for additional valves in the suction lines.

In an arrangement which is especially favorable in terms of mounting space, one of the suction valves is provided on the movable pump piston and the other one is arranged on the housing.

It is an advantage that the suction valves are axially opposed because, as a result, the axial dimensioning of a cylindrical pressure chamber is regardless of the position of the suction valves.

The difference of the pilot pressures during a brake slip control operation and a traction slip control operation can be produced by differently dimensioning the opening cross-sections of the suction valves.

Thus, an application of both closure members of the suction valves by a common compression spring in the direction so as to close is possible, because the opening pressures are determined by the different opening cross-sections.

Even when using a common compression spring for both closure members, the load of the closure member of the second valve can be reduced by a second compression spring, which is weaker than the compression spring interposed between the closure members, counteracting the interposed compression spring.

The use of balls as closure members, instead of specially designed closure members, saves costs.

A variable captivation of the valve spring is principally achieved by a lever assembly on the pump. Proximate the upper dead center of the delivery piston, the valve spring is retained by the lever elements, thereby permitting the aspiration of fluid at a low pilot pressure already at the beginning of a piston movement away from the upper dead center. Thus, the total difference in pressure between the suction port and the pressure chamber contributes to accelerating the pressure fluid, without suffering from valve pilot pressures which must be overcome. Proximate the lower dead center, the valve spring is largely relieved from load, so that a further application by the lever elements is not required.

An application of the lever elements is disclosed and is particularly advantageous in a space-saving positioning of the valve spring within a compression spring that resets the delivery piston. In this arrangement, the variable force, which is responsive to the stroke of the delivery piston, can be generated by the compression spring that resets the delivery piston, or by a stop on the housing.

The present invention permits mounting the lever elements in one assembly operation. The integral manufacture of all lever elements and the interposed connecting portions eliminates the need for premounting the lever assembly.

It is particularly inexpensive to manufacture the one-piece transmitting element as a sheet-metal punched part.

An additional force is superimposed on the force exerted by the valve spring. The magnitude and direction of the additional force is variable as a function of the speed and/or the acceleration of the delivery piston, thereby facilitating the opening of the valve during the suction stroke.

This arrangement is achieved in a particularly simple and low-cost fashion by a friction element applying a specific friction resistance to the closure member. Thus, the closure member is exposed to a force directed opposite to the force of the valve spring during the suction stroke. The friction element can be positioned in the area of an element that guides the closure member, for example.

An additional force that is proportional to the speed of the delivery piston can be achieved by connecting the closure member with an element having a large flow resistance during the movement of the piston from the upper to the lower dead center. Advantageously, the design of the element is aerodynamically more favorable in the opposite direction. The aerodynamically unfavorable element can be designed integrally with the closure member.

According to another measure by which an additional force can be easily exerted on the closure member, the closure member is connected with an inertia member having a great mass compared to the mass of the closure member. Favorably, the inertia member can be arranged in the dead space produced by the overall length of the valve closure spring. Thus, additional structural volume is not required.

A preloading force which is constant over the entire suction stroke of the delivery piston and acts upon the closure member can be achieved by conforming the mass of the inertia member to the rated rotational speed of a motor driving the pump.

Accordingly, the force, caused by the inert mass, and the variable portion of the spring force, caused by the compression of the valve spring, are conformed to one another such as to neutralize, with the operational rotational speed predetermined. Thus, the delivery rate of the pump can be maximized with this predetermined operational rotational speed.

It is self-explanatory that the proposed individual measures can be combined advantageously.

BRIEF DESCRIPTION OF THE DRAWINGS

3 is a view of a third embodiment of a pump mountable in a brake system according to the present invention, wherein the valve seat of the suction valve is arranged on the delivery piston, FIG. 3a showing a longitidunal cross-section through a pump of the present invention, and FIG. 3b being a top view of a transmitting element therefor.

DETAILED DESCRIPTION OF THE PREFERRED EMBODIMENT

Figure 1:
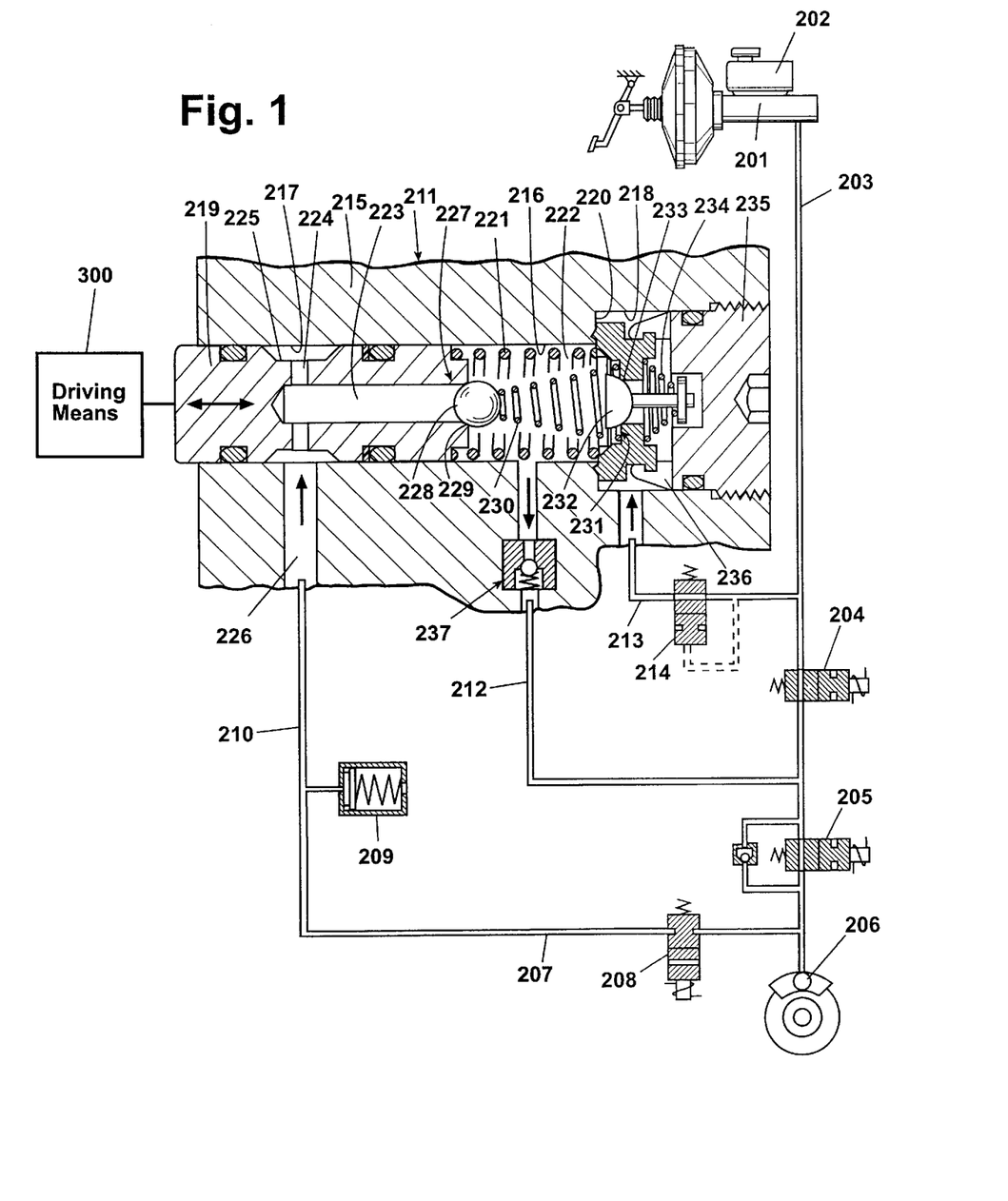
FIG. 1 is a view of a brake system and a first embodiment of a pump assembly according to the present invention.

In FIG. 1, a master brake cylinder 201 is connected to a pressure fluid reservoir 202. Brake line 203 extends from the master brake cylinder 201 to a wheel brake cylinder 206 of a driven wheel by way of an electromagnetically actuated cut-off valve 204, open in its deenergized state, and an inlet valve 205 which is also actuated electromagnetically and open in its deenergized state. Return line 207 extends from the wheel brake cylinder 206 to low-pressure accumulator 209 by way of an electromagnetically actuated outlet valve 208 which is closed in its deenergized state. Pump 211 delivers pressure fluid, with a driving means 300 from the low-pressure accumulator 209 through the first suction line 210 into pressure line 212 which terminates into the brake line 203 between cut-off valve 204 and inlet valve 205. A second suction line 213 of pump 211 is connected to brake line 203. A change-over valve 214, which is open in its unpressurized state and is operated hydraulically by the pressure of the master brake cylinder 201, is inserted into the second suction line 213.

It is of no importance to the present invention whether the pump 211 aspirates pressure fluid from the pressure fluid reservoir 202 through the brake line 203 and the master brake cylinder 201 for traction slip control operations, or whether the second suction line 213 is directly connected to the pressure fluid reservoir 202 because pressure fluid may flow through the master brake cylinder 201 in the non-actuated condition.

Housing 215 of pump 211 has a one-step through-bore 216. In small-diameter bore portion 217, piston 219 is sealed to the bore wall and extends to the atmosphere. Large-diameter bore portion 218 is closed (pressure-tight) by screw cap 235. Pressure chamber 222 accommodating resetting spring 221 is arranged between the end of piston 219 within the bore and an extension step 220. Resetting spring 221 is supported on a step-like valve seat 233 of the second suction valve 231 and acts upon the frontal end of the piston 219 within the bore to the atmosphere. From the inside of the bore, an axial blind-end bore 223 extends into piston 219. At its end, blind-end bore 223 is connected through transverse bore 224 to the circumferential annular groove 225 which extends to the first suction port 226 connected to the low-pressure accumulator 209. A first suction valve 227 is provided at the orifice of the blind-end bore 223 to the pressure chamber 222. A valve seat 229 of the first suction valve 227 is formed at the piston end, while a closure member 228 is acted upon by valve spring 230 towards the valve seat. Valve spring 230 is also supported on a step-like valve seat 233 supported on a valve seat 233 of a second suction valve. Valve seat 233 of a second suction valve 231 is positively connected with a screw cap 235 by detents 236 and is pressed by the screw cap against the extension step 220 in a pressure fluid tight manner. Valve spring 234 of the second suction valve 231 is positioned between the valve seat 233 and the screw cap 235. Valve spring 234 acts upon an annular disc which is connected to a tappet shaped on the closure member 232 of the second suction valve 231.

Also, valve spring 234 is supported on valve seat 233 and acts upon the annular disc towards the screw cap 235.

Closure member 232 has a semispherical design, and the tappet is fitted in the middle of the spherical surface. A connection extends radially from the pressure chamber 222 to the compression valve 237 which is connected by way of pressure line 212 to brake line 203 between cut-off valve 204 and inlet valve 205.

The pilot pressure of the two suction valves 227 and 231 is determined by the diameter of the valve seats 229 and 233, on the one hand, and by the spring forces of the valve springs 230 and 234, on the other hand. A pilot pressure in the amount of the atmospheric pressure or in excess of this pressure is appropriate for the first suction valve 227 because a decline in pressure below atmospheric pressure in the low-pressure accumulator 209 and in the wheel-brake cylinder 206 is prevented thereby. Such precautions are not required for the suction valve 231. Rather, a maximum possible delivery rate shall be achieved. To this end, the pilot pressure of the second suction valve 231 is below atmospheric pressure and, preferably, amounts to 0.2 bar approximately.

Figure 2:
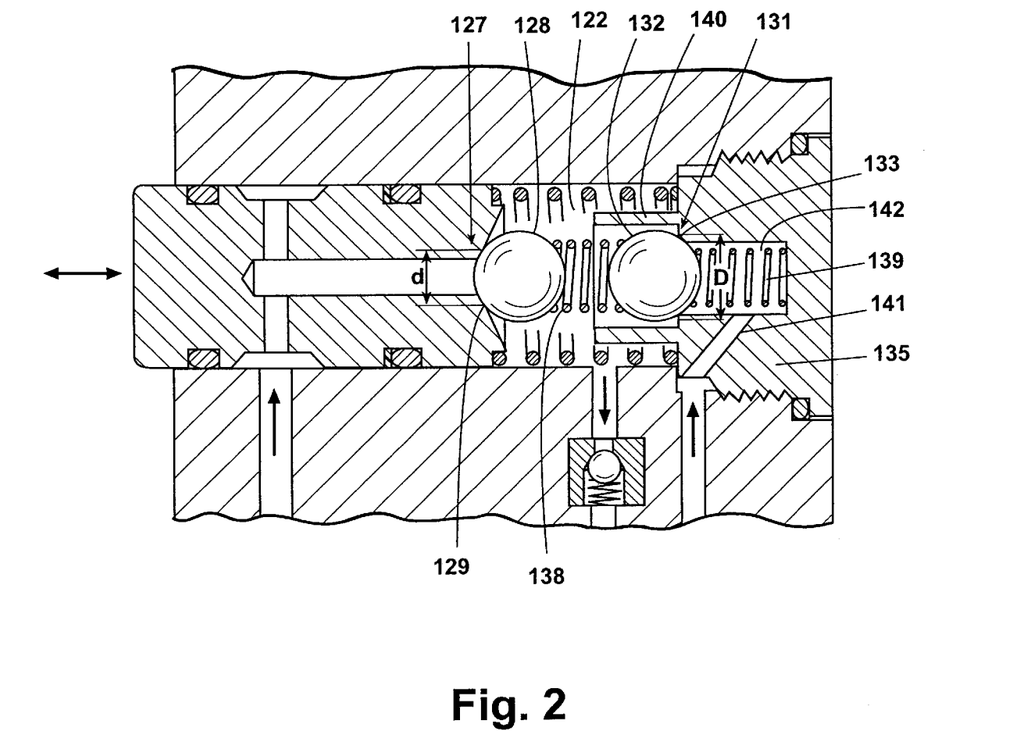
FIG. 2 is a view of a second embodiment of a pump assembly mountable in a brake system according to the present invention.

FIG. 2 shows another low-cost variant of a pump assembly appropriate for use in a brake system as in the embodiment of FIG. 1. Because the pump assembly of FIG. 2 is in many features not different from the pump assembly of FIG. 1, only the differences will be described hereinbelow. Parts having the same function as in FIG. 1 have been assigned reference numerals lowered by 100.

The most important difference compared to FIG. 1 is that the closure members 128 and 132 of the first suction valve 127 and the second suction valve 131 are customary metal balls acted upon by a common valve spring 138, interposed between the valves, in the direction so as to close. The different pilot pressures can be adjusted by the opening cross-sections having different dimensions. This means that the diameter d of the line of contact of the closure member 128 at the valve seat 129 of the first suction valve 127 is considerably smaller than the diameter D of the line of contact of the closure member 132 at the valve seat 133 of the second suction valve 131. In addition, another compression spring 139 can act upon the closure member 132 in the opening direction so that the spring force of the valve spring is compensated in part. The compression spring 139 can be supported on the screw cap 135. Due to the arrangement of the valve spring 138 in the pressure chamber 122, the valve seat 133 of the second suction valve 131 can be designed integrally with the screw cap 135. The connection for the second suction line is through the inclined bore 141 extending diagonally in the screw cap 135 into the cavity 142 in the screw cap 135. Cavity 142 is isolated from the pressure chamber 122 by the second suction valve 131. When needed, cavity 142 also houses the compression spring 139. For reasons of stability, a guide member 140 is fitted to the screw cap 135 on the side of the pressure chamber 122. Guide-member 140 limits the radial play of the closure member 132 of the second suction valve 131. Guide member 140 is a hollow cylinder which is made in one piece with the screw cap 135.

The integral design of valve seat 133 and screw cap 135 results in a simplified assembly. Further cost reduction is achieved by the use of a common valve spring 138 and spherical closure members 128 and 132.

Figure 3:
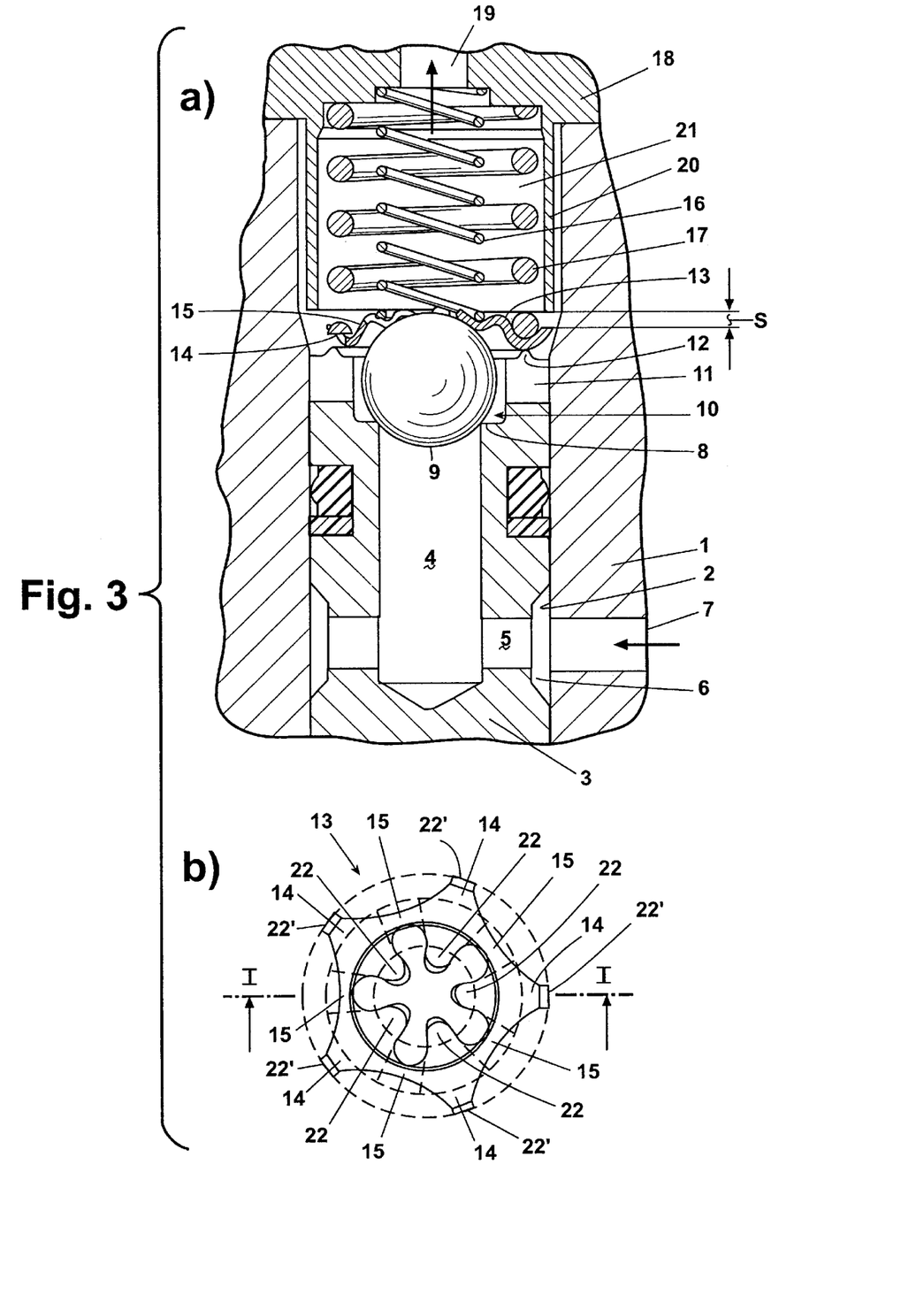

FIG. 3 is subdivided into a part 3a and a part 3b. Part 3a shows a longitudinal cross-section through a pump of the present invention, and part 'b' is a top view of the transmitting element.

The pump in FIG. 3a includes in housing 1 a housing bore 2 in which a delivery piston 3 is sealed and movable. The delivery piston 3 has a longitudinal blind-end bore 4 and a transverse bore 5 at its end which terminates into a circumferential annular groove 6 on the delivery piston 3. In the axial area of the annular groove 6, a radial suction port 7 is provided in the housing 1. Valve seat 8 of suction valve 10 is provided on the delivery piston at the open end of the longitudinal bore 4. The delivery piston 3 has an axial extension 11 radially outside the valve seat 8 to radially guide a closure member 9 of the suction valve 10. Extension 11 has radial apertures so that the pressure fluid flow is not impeded. Further, extension 11 has an axial stop bead 12 on which a transmitting element 13 is supported and which determines the tilting axes of lever elements 14 comprised in the transmitting element 13.

As can be seen in FIG. 3b, the lever elements 14 having a large radial expansion and connecting portions 15 of only small radial dimensions alternate on the transmitting element 13.

The connecting portions 15 and the lever elements 14 between them form a ring. Each lever element 14 has one inwardly, 22, and one outwardly, 23, projecting tongue. The ends of the tongues form the lever arms. Preferably, the transmitting element 13 is shaped in one piece from a sheet-metal punched part.

The dashed circles show the lines of contact between the functional elements and the transmitting element. The circle of smallest diameter shows the line of contact of the valve spring 16. The circle of medium diameter is acted upon by the resetting spring 17 which presses the transmitting element 13 on the stop bead 12 having a like diameter. The resetting spring 17 acts from the same axial side on the transmitting element 13 as the valve spring 16. A stop on the housing for the valve spring 16 and the resetting spring 17 is provided by a screw cap portion 18 which has an axial pressure channel 19 leading to a pressure valve (not shown).

A stop sleeve 20 encompassing the resetting spring 17 is formed on the screw cap portion 18. When the delivery piston 3 moves to the screw cap portion 18, the stop sleeve 20, after having overcome the travel distance 's', acts upon the line of contact of largest diameter of the transmitting element 13. This limits the movement of the external tongue 23 of the lever elements 14 towards the screw cap portion 18, with the result that the transmitting element 13 deforms and the internal tongues 22 of the lever elements 14 compress the valve spring 16. The spherical closure member 9, which is interposed between the valve seat 8 and the transmitting element 13, is thereby relieved from the force of the valve spring.

FIG. 3a shows the lower dead center, i.e. the piston is in its deepest position. This means that the pressure chamber 21, which is expanded by the resetting spring 17, has its largest volume. The transmitting element 13 is not yet in contact with the stop sleeve 20 so that the valve spring 16, by way of the transmitting element 13, acts upon the closure member 9 and determines the opening pressure of the suction valve 10. The piston stroke to the upper dead center must be sized to be larger than the distance (devoted as 's') between the transmitting element 13 and the stop sleeve 20 to cause the transmitting element 13 to deform and to cause the internal tongue 22 to compress the valve spring 16.

Figure 4:
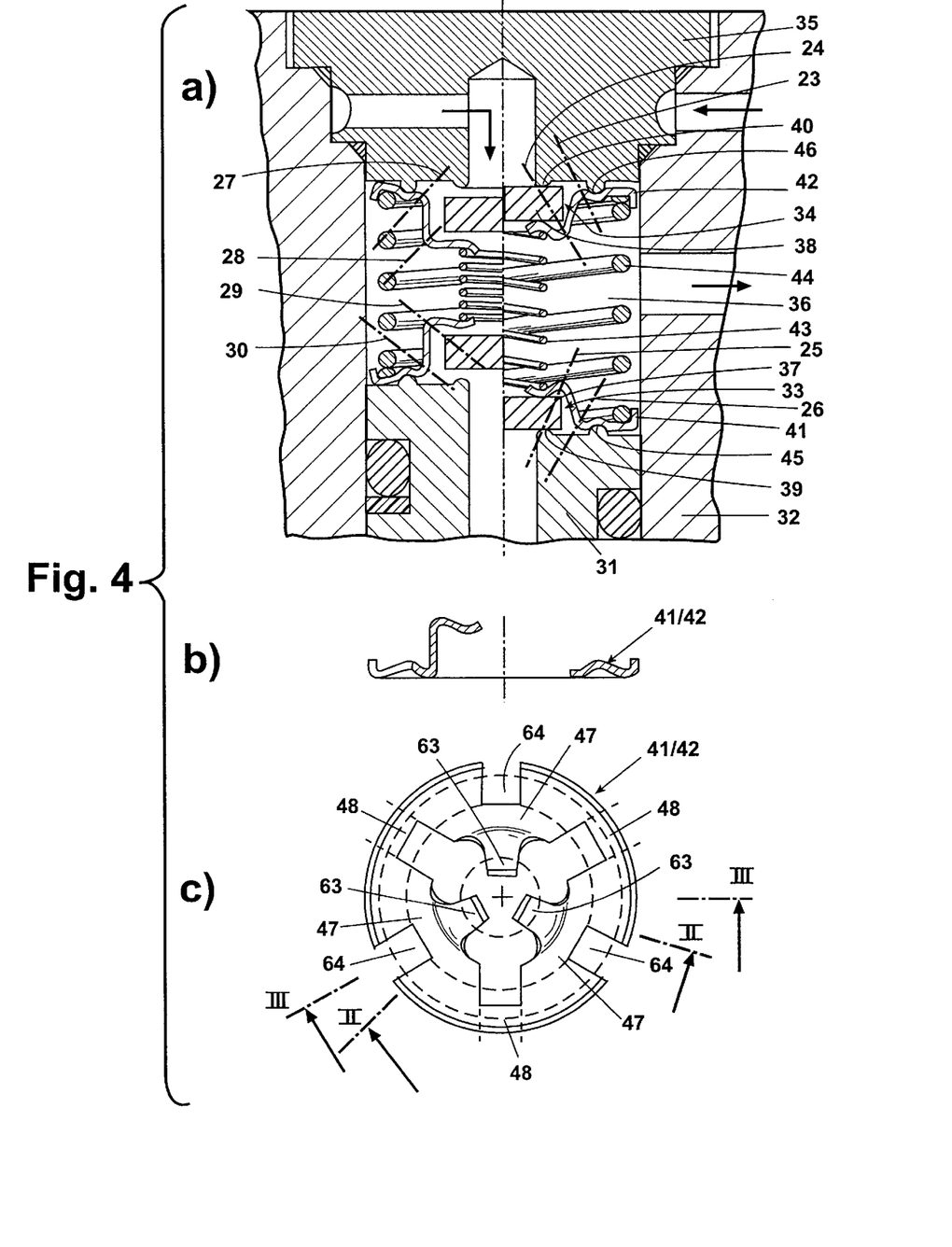
FIG. 4 is a forth embodiment of a pump, mountable in a brake system according to the present invention, including two suction valves: one suction valve on the delivery piston and one suction valve on a closure cover on the housing, FIG. 4a showing a cross-sectional taken through a pump of the present invention, and FIGS. 4b and 4c showing a transmitting element therefor, FIG. 4b being a front view of the transmitting element taken in different cross-section planes, and FIG. 4c being a top view of the transmitting element.

FIG. 4 is subdivided into parts 4a 4b and 4c. Part 4a shows a cross-section taken through a pump, while parts 4b and 4c show one of the transmitting elements. The pump shown in FIG. 4a has two suction valves 33 and 34 in housing 32. The suction valves define the pressure chamber 36 on both axial sides. Suction valve 33 is provided on delivery piston 31, and suction valve 34 is formed on a screw cap portion 35. Except for the fact that the suction valve 33 is moved with the delivery piston 31, both suction valves 33 and 34 have a completely symmetrical structure. Their closure members 37 and 38 include elastomeric discs, and valve seats 39 and 40 are formed of an axial annular bead shaped at the delivery piston 31 and the screw cap portion 35, respectively.

Each closure member 37 and 38 has a transmitting element 41 or 42. Valve spring 43 and resetting spring 44 are interposed between the transmitting elements 41 and 42.

As in the embodiment of FIG. 1, valve spring 43 in FIG. 4 is arranged within resetting spring 44 and has the smallest abutment radius at the transmitting elements 41 and 42, as can be seen by the dotted circles in FIG. 4c. Resetting spring 44 is offset in a radially outward direction with respect to stop beads 45 and 46, and, due to its progressive characteristic curve, forms a variable force which causes captivation of valve spring 43 at the upper dead center of delivery piston 31. The stop beads 45 and 46, in turn, determine the tilting axes of the transmitting elements 41 and 42.

As is shown in the left half of the drawing of FIG. 4a, the closure members 37 and 38 are freely movable at the upper dead center of the delivery piston 31. Closure members 37 and 38 are urged against their valve seats 39 or 40 only by an excess pressure which is determined by the dimensioning of the pressure valve (not shown). As soon as the delivery piston 31 moves in the direction of the lower dead center, shown in the right half of the drawing, pressure fluid can enter the pressure chamber 36 without restriction. However, at the lower dead center of the delivery piston, the valve spring 43 exerts a greater lever momentum on the transmitting elements 41 and 42 than the resetting spring 44. Thus, the closure members 37 and 38 are acted upon by the force of valve spring 43, and a determined difference in pressure is required to open the suction valves 33 and 34.

FIG. 4b shows one of the transmitting elements 41 and 42 in a different cross-sectional plane, to show how the tongues and recesses shown in FIG. 4c act with respect to the profile of the transmitting elements 41 and 42.

The transmitting element 41 or 42, shown in a top view in FIG. 4c, is subdivided into three lever elements 47 and three connecting portions 48 interposed between them. The transmitting element in FIG. 4c differs from the transmitting element in FIG. 3 in that, instead of the five lever elements 14 in FIG. 3, only three lever elements 47 are provided. Further, the lever elements 47 have a different shape.

The inwardly directed tongues 47' have no associated outwardly directed tongues. Instead, radially recesses which increase the flexibility of the transmitting element are provided in these angular portions at the external periphery of the transmitting element. The lever elements 47 extend over a larger range of circumference so that the actual outside lever arm extends along the periphery on both sides of the recesses. The transmitting element shown is a shaped sheet-metal punched part as in the embodiment of FIG. 3.

Figure 5:
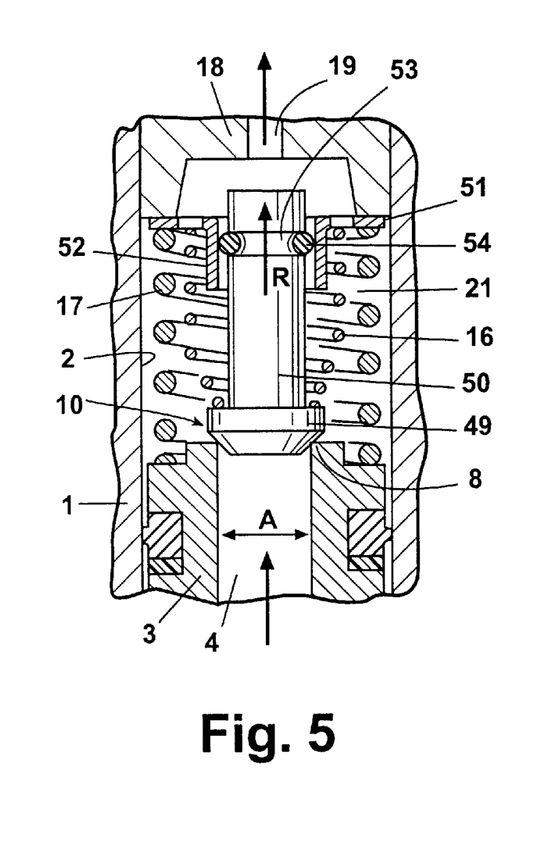
FIG. 5 is a cross-sectional view of a pressure chamber of a fifth embodiment of a pump with a friction element, mountable into a brake system according to the present invention.

FIG. 5 shows a cross-sectional view of the pressure chamber 21 of a pump according to the present invention. A housing bore 2 is provided in the housing 1 of the pump, shown in part only. Delivery piston 3 is sealed and movable in housing bore 2. Delivery piston 3 has a longitudinal bore 4 which is connected to a suction port (not shown) of the pump. Valve seat 8 of the suction valve 10 is provided on delivery piston 3 at the upper end of longitudinal bore 4. Closure member 49 has an extension 50 which extends in the direction remote from the delivery piston 3. A valve spring 16 is supported on the closure member 49, on the one hand, and on a spring retainer 51, on the other hand, which has a stop on screw cap portion 18. The screw cap portion 18 includes a pressure channel 19 which leads to the pressure side of the pump by way of a pressure valve (not shown).

Pressure chamber 21 is confined by the housing bore 2, the screw cap portion 18 and the delivery piston 3. A resetting spring 17 is interposed between the delivery piston 3 and the spring retainer 51 and displaces the delivery piston 3 in the direction of its lower dead center.

The spring retainer 51 has a cylindrical portion 52, in which the extension 50 is guided by way of a friction element 54 arranged in a groove 53 of the extension 50. The axial dimension of the cylindrical portion 52 is larger than the total stroke of the delivery piston 3.

FIG. 5 shows the delivery piston 3 before it reaches the upper dead center, i.e. shortly before the end of the pressure stroke. Pressure fluid is conducted through the pressure channel 19 in the direction of the arrow. Upon attainment of the upper dead center, the direction of movement of the delivery piston 3 is reversed. Piston 3 moves downwardly, as viewed in the drawing. The friction element 54 causes application of a friction force R on the closure member 49 which is directed in opposition to the preload of the valve spring 16. Thus, a smaller preload results. Consequently, the closure member 49 opens at a lower difference in pressure, prevailing between the longitudinal bore 4 and the pressure chamber 2, than without the action of force R.

Figure 6:
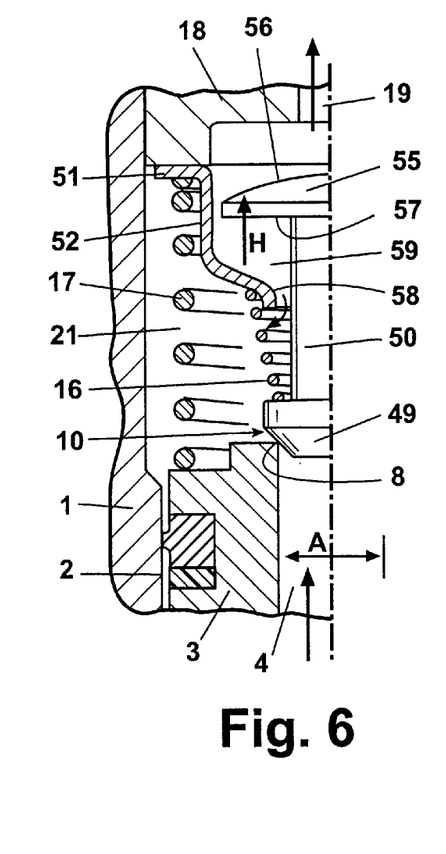
FIG. 6 is a cross-sectional view of a pressure chamber of a sixth embodiment of a pump with an aerodynamically unfavorable element, mountable into a brake system according to the present invention.

FIG. 6 shows a closure member 49 with an aerodynamically unfavorable element 55. Only the half that is disposed on the left side of the axis of symmetry is shown, and component parts identical with those in FIG. 5 are assigned like reference numerals. The aerodynamically unfavorable element 55 is a spherical section having its curved surface 56 arranged in the direction of the pressure channel 19, and its plane backward surface 57, having a great flow resistance, faces the delivery piston 3. The cylindrical portion 52 has a larger diameter than in the embodiment of FIG. 5 in order to receive element 55.

Cylindrical portion 52 has a tapered portion 58 on which valve spring 16 is supported.

During the suction stroke of the delivery piston 3, pressure fluid accumulates in the portion 59 below the annular surface 57, whereby a hydraulically generated force H acts on the element 55 which counteracts the preloading force of the valve spring 16 and, thus, permits opening of the suction valve 10 already at a low difference in pressure between the longitudinal bore 4 and the pressure chamber 21.

Figure 7:
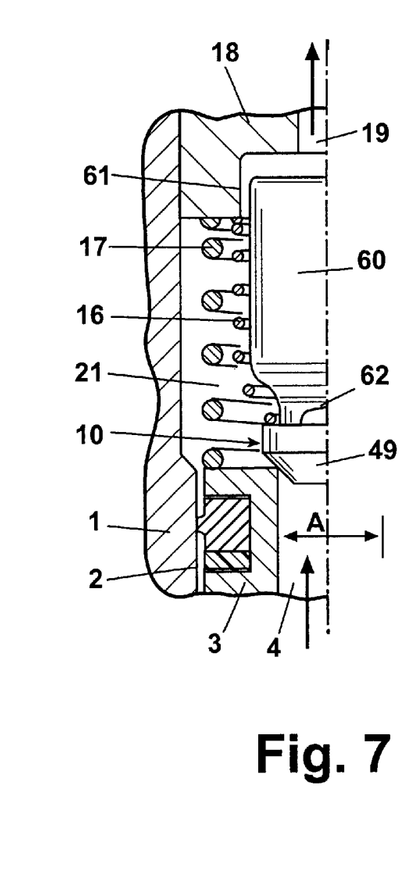
FIG. 7 is a cross-sectional view of a pressure chamber of a seventh embodiment of a pump with an inertia member, mountable into a brake system according to the present invention.

FIG. 7 shows a portion of a pump according to the present invention which includes a closure member 49 connected to an inertia member 60. In FIG. 7, like parts have been assigned like reference numerals as in the preceding Figures. There is no need for a spring retainer, and the resetting spring 17 and the valve spring 16 are supported directly on the screw cap portion 18. The inertia member 60 is guided in a hollow-cylindrical portion 61 of the screw cap portion 18 and has a substantially cylindrical shape. Inertia member 60 tapers towards the closure member 49, so that a step 62 is formed against which the valve spring 16 bears.

The valve spring 16 is rated such that in the lower dead center a difference in pressure of p=50 . . . 100 mbar, which prevails between the longitudinal bore 4 and the pressure chamber 21, is sufficient to open the suction valve 10. The necessary difference in pressure is increased by the compression of the valve spring 16 during the pressure stroke until the upper dead center is reached.

The additional force caused by the mass of the inertia member 60 counteracts the force exerted by the valve spring 16. The maximum of the additional force is in the range of the upper dead center, and its minimum is in the range of the lower dead center.

The operating point of the pump can be moved to the range of the resonance of the vibrating spring-mass system by appropriately conforming the mass and the rotational speed of a motor driving the delivery piston 3. In the resonance range, the necessary opening pressure is minimal in each point disposed between the upper and the lower dead centers.

It is particularly preferred to provide a "resonant" rating with respect to a high rotational speed shortly below the idle speed of the motor driving the pump because the maximum fluid flow is required for pressure build-up in this case during traction slip control operations.

We claim:

1. A hydraulic brake system with brake slip control and traction slip control, comprising:
   a master brake cylinder that is connected to a pressure fluid reservoir,
   at least one wheel brake cylinder associated with a driven wheel,
   a brake line from the master brake cylinder to the wheel brake cylinder,
   an inlet valve in the brake line,
   a low-pressure accumulator,
   a return line from the wheel brake cylinder to the low-pressure accumulator,
   an outlet valve in the return line,
   a self-priming pump having a housing comprising a pressure chamber,
   a cut-off valve in the brake line between the master brake cylinder and the inlet valve,
   a pressure line from the pressure chamber to the brake line between the cut-off valve and the inlet valve,
   a pressure valve between the pressure chamber and the pressure line,
   a first suction line between the low-pressure accumulator and the pressure chamber,
   a second suction line between the pressure fluid reservoir and the pressure chamber,
   a change-over valve in the second suction line,
   a first suction valve between the low-pressure accumulator and the pressure chamber,
   a second suction valve between the change-over valve and the pressure chamber,
   wherein the pump housing accommodates the first and the second suction valves,
   a valve spring,
   a reset spring, and,
   a transmitting element having a plurality of lever elements extended in a radial direction wherein the transmitting element is adapted to receive the valve spring and the reset spring.

2. The hydraulic brake system as claimed in claim 1, wherein the second suction valve is provided with a valve seat on the housing, whereas the first suction valve is provided with a valve seat on a movable piston.

3. The hydraulic brake system as claimed in claim 1, wherein the pressure chamber is substantially cylindrical and is defined at each axial end thereof by the first and the second suction valves, respectively.

4. The hydraulic brake system as claimed in claim 1, wherein a surface of a closure member of the second suction valve upon which pressure in the second suction line acts in an opening direction is larger than a surface of a closure member of the first suction valve upon which pressure in the first suction line acts.

5. The hydraulic brake system as claimed in claim 4, wherein the valve spring is interposed between the closure members of the first and the second suction valves and acts upon the both closure members in a direction of closing the first and the second suction valves.

6. The hydraulic brake system as claimed in claim 5, wherein the closure member of the second suction valve is acted upon by a compression spring that counteracts the valve spring and is weaker than the valve spring.

7. The hydraulic brake system as claimed in claim 4, wherein the closure members are balls.

* * * * *